United States Patent [19]

Piwczyk

[11] Patent Number: 4,749,840

[45] Date of Patent: Jun. 7, 1988

[54] INTENSE LASER IRRADIATION USING REFLECTIVE OPTICS

[75] Inventor: Bernhard Piwczyk, Carlisle, Mass.

[73] Assignee: Image Micro Systems, Inc., Billerica, Mass.

[21] Appl. No.: 864,448

[22] Filed: May 16, 1986

[51] Int. Cl.⁴ ............................................ B23K 26/00
[52] U.S. Cl. ........................ 219/121 LH; 219/121 LJ; 219/121 LQ; 219/121 LS
[58] Field of Search .................... 219/121 LJ, 121 LQ, 219/121 L, 121 LM, 121 LS, 121 LT, 121 LZ, 121 LK, 121 LL, 121 LH; 350/613, 620; 372/101, 108

[56] References Cited

U.S. PATENT DOCUMENTS

| | | | |
|---|---|---|---|
| 3,256,524 | 6/1966 | Staufter | 219/121 LT X |
| 3,369,101 | 2/1968 | Curcio | 219/121 LZ X |
| 3,463,898 | 8/1969 | Takaoka et al. | 219/121 LT X |
| 4,118,752 | 12/1978 | Gravel | 219/121 LT X |
| 4,128,309 | 12/1978 | Lehureau et al. | 350/295 |
| 4,167,662 | 9/1979 | Steen | 219/21 LQ X |
| 4,215,263 | 7/1980 | Grey et al. | 219/121 LQ X |
| 4,478,677 | 10/1984 | Chen et al. | 219/121 LT X |
| 4,518,232 | 5/1985 | Dagenais | 219/121 LQ X |

FOREIGN PATENT DOCUMENTS 0193291 11/1982 Japan ............................. 219/121 LQ
0205675 11/1983 Japan ............................. 219/121 LT Primary Examiner—C. L. Albritton
Attorney, Agent, or Firm—Robert T. Dunn

[57] ABSTRACT

Intense far-ultraviolet laser radiation is applied to a workpiece in performance of processes in the fabrication of integrated circuits, including processes of ablation, deposition, impurity implantation and radiation induced chemical processes. Other processes where intense far-ultraviolet laser radiation is applied include hardening and annealing a workpiece by exposure to the radiation. Particular embodiments of the invention herein enables selective removal of a polymer film on a semiconductor substrate by ablative photodecomposition (APD) using intense far-ultraviolet, or shorter wave length, radiation from a pulsed laser requires focusing the laser radiation to provide sufficiently high fluence of laser light energy to ablate a selected area of the polymer to a useful depth in a reasonable time, sometimes referred to as the threshold of fluence of the laser pulses required to produce effective APD of the polymer. This is done with a reflective objective lens system between the laser and the polymer film that focuses the laser beam on a target area of the film surface to a high fluence image of the beam exceeding the threshold for APD. All optical surfaces of the objective lens system are reflective and so are not damaged by the intense radiation as refractive lenses can be. In a preferred embodiment, the reflective objective lens system includes two reflectors, one large concave reflector with an entrance aperture at the center facing the target and one small centrally-located convex reflector facing away from the target.

45 Claims, 3 Drawing Sheets

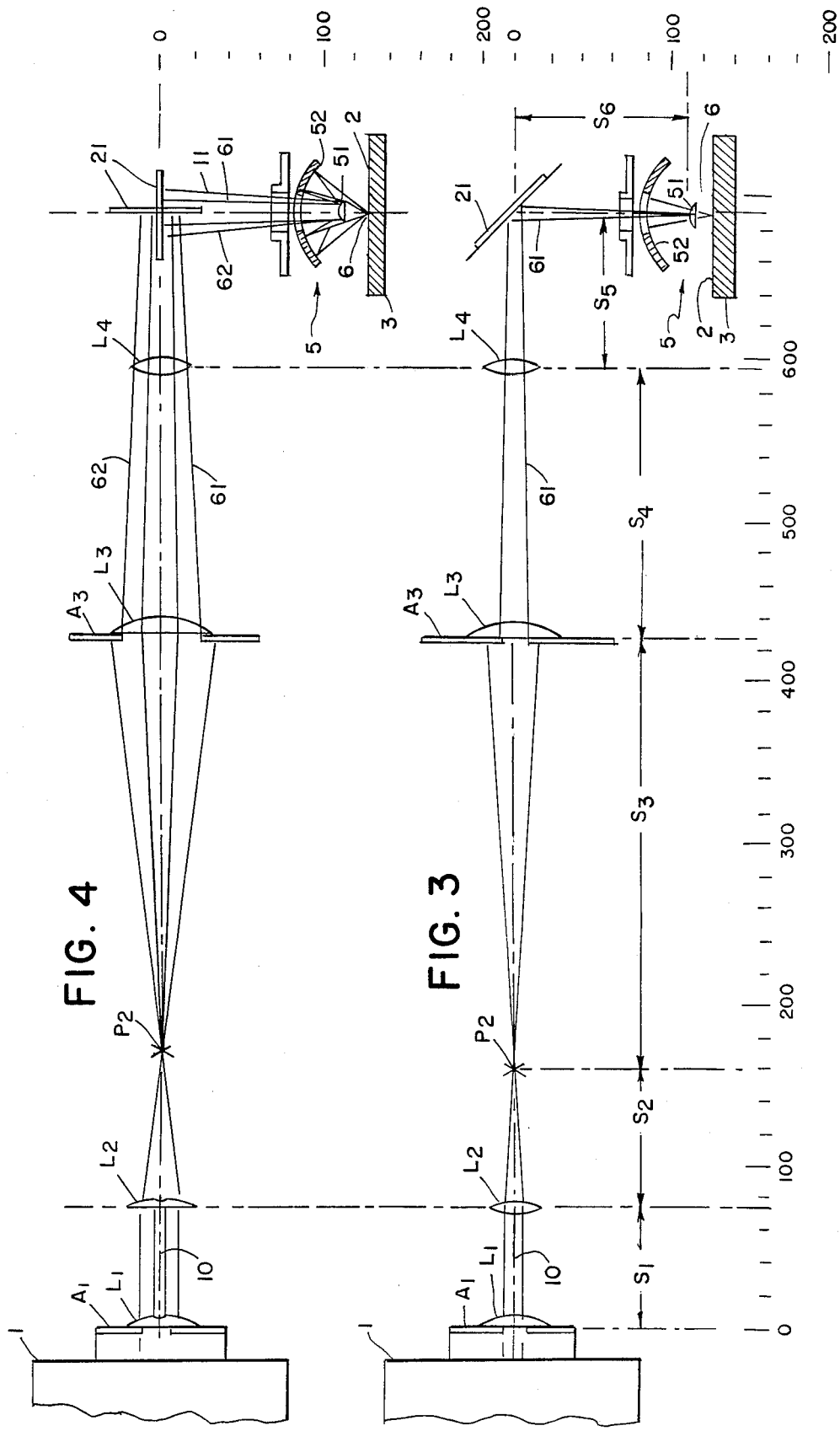

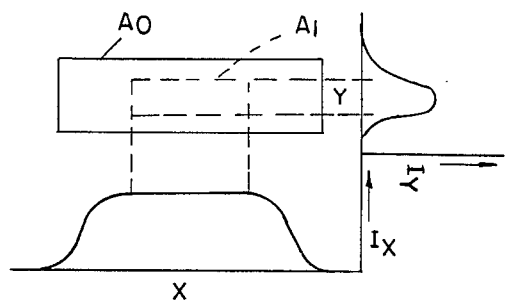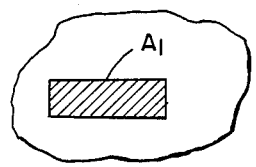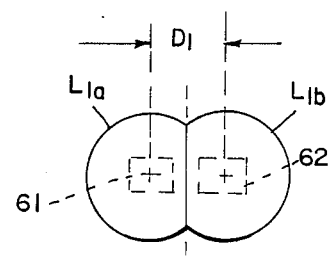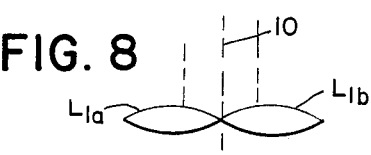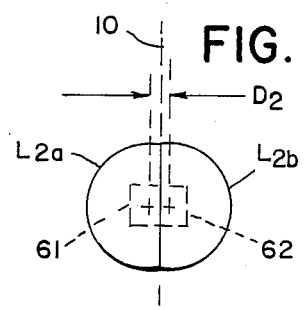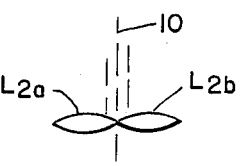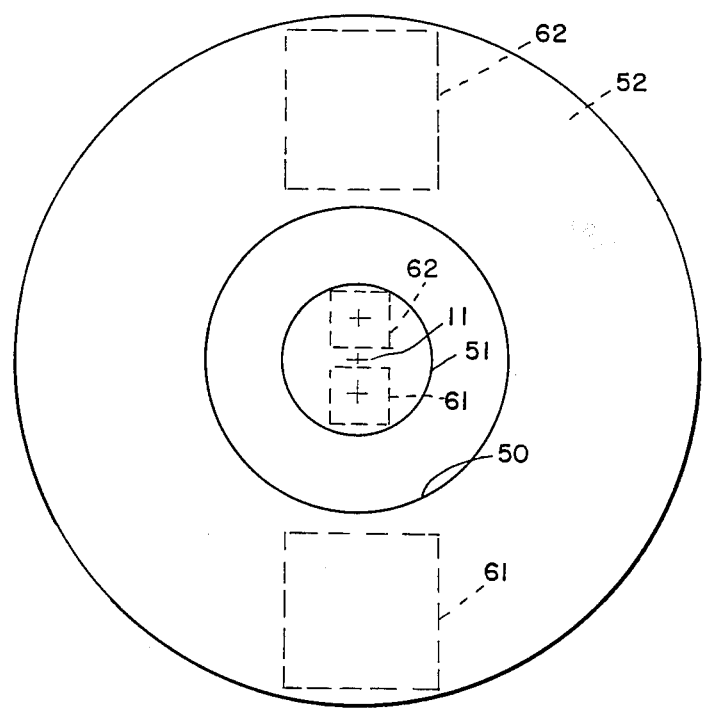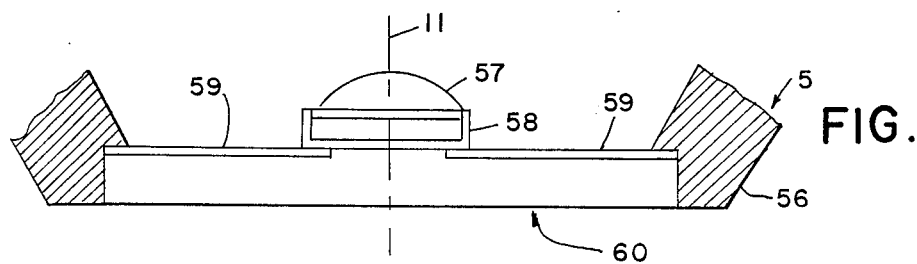

INTENSE LASER IRRADIATION USING REFLECTIVE OPTICS

BACKGROUND OF THE INVENTION

This invention relates to methods and means of applying intense far-ultraviolet laser radiation to a workpiece. It has application to some of the processes in the fabrication of integrated circuits including processes of laser induced ablation, deposition, impurity implantation and other chemical processes. It has a wide range of applications: from hardening or annealing a workpiece to cutting biological tissue in surgery. Specific embodiments of the invention described herein are particularly concerned with focusing a beam of far-ultraviolet radiation from a laser to an image of high fluence, sufficiently high to cause useful ablative photodecomposition (APD) of the material at the target.

Photolithography Using Photoresist Film

Heretofore, semiconductor fabrication processes have witnessed the use of electron beams, x-rays and ion beams to expose fine patterns of a mask on a photoresist film on the doped surface of a thin semiconductor wafer substrate. The photoresist is then washed with a solvent that removes the unexposed (or the exposed) photoresist baring the semiconductor doped surface for the next step, which may be, for example, etching with chemicals. This process is called photolithography. The intensity of the exposing radiation is relatively low. Successive processes like this use other masks to expose other fine patterns on new films of photoresist and in this way an array of integrated circuits are formed layer by layer on the wafer substrate.

In these efforts, the shorter wavelength radiation is sought, because it enables greater resolution. This consideration has promoted interest in using deep or far-ultraviolet radiation, is defined as the 150 to 400 nanometers (nm) wavelength. This effort has been limited by the shortcomings of the sources of far-ultraviolet radiation. These sources are usually mercury or deuterium lamps. Far-ultraviolet laser sources had also been considered; however, they had proved impractical due to interference patterns called "speckle" that laser sources produce. On the other hand, excimer lasers have proven to be ideal, because they produce pulses of sufficient intensity and they lack good spatial coherence within the laser beam, as the beam is multimode. The lack of good spatial coherence means that the wave-lengths of the laser beam will not interfere constructively or destructively at the photoresist surface, and so will not produce the patterns called "speckle."

In all of these photolithography processes, a photoresist film is exposed by radiation through a mask and the intensity of the radiation on the photoresist need only be great enough to induce the chemical reaction in it (usually polymerization or depolymerization) to make it insoluable in a solvent that disolves the photoresist which is not so exposed. Other processes involving radiation exposure do not use a photoresist in this way and require much greater intensity of radiation to carry out.

Processes Requiring Very Intense Radiation

Photochemical reactions at the surface of a semiconductor can be induced by an intense laser beam directed to the surface. In some cases, the laser beam simply heats the surface to induce the chemical reaction. These processes include gas-phase operations such as plasma etching and chemical vapor deposition. However, some compound semiconductor materials, such as gallium arsenide, being used increasingly in fast circuits, decompose at the temperature raised by an impinging laser beam, and so simple heating is not satisfactory. Such heating can be avoided by using a far-ultraviolet laser beam, because the higher photon energy of the far-ultraviolet beam is sufficient to dissociate molecules producing large amounts of free radicals that then deposit on or etch a semiconductor surface without heating the surface. Another benefit of the far-ultraviolet laser beam radiation is that at far-ultraviolet wavelengths, many materials absorb so strongly that the light penetrates only a very thin layer of the surface and so rapid heating, melting and cooling of the surface region can be accomplished using far-ultraviolet laser beams in an annealing process.

Ablative photodecomposition (APD) is a phenomenon observed at the surface of, for example, an organic polymer chemical compound (this includes many photoresist materials) to which far-ultraviolet laser pulses are directed, for which the fluence of a pulse exceeds a threshhold. At low far-ultraviolet light intensity, such as from a mercury lamp, material may be oxidized at a significant rate from the irradiated area of the surface in the presence of air or oxygen. At higher far-ultlraviolet light intensity, such as produced by a far-ultraviolet laser, the APD process becomes operative at the surface.

The APD process leads to the spontaneous removal of material from the irradiated area by a non-linear process. A suitable source of far-ultraviolet laser pulses is the argon-fluoride (ArF1) excimer laser, which produces radiation at 193 nanometers (193 nm). This laser typically produces pulses up to a few hundred millijoules per square centimeter ($mJ/cm^2$) at a repetition rate up to several hundred per second, and the intensity of the pulses are (for practical purposes) invariant over many thousands of pulses. Any of the polymer chemical compounds such as polycarbonate, polymide, polyethylene terephthalate, and polymethyl methacrylate (PMMA), can be ethced by far-ultraviolet laser pulses of fluence exceeding a threshold of about 50 $mJ/cm^2$ by the APD process.

According to the APD process, the energy of a far-ultra-violet photon is sufficient to exceed the bond dissociation energy of the chemical bonds. That is the case for 193 nm far-ultraviolet radiation. Beyond that, the excess energy of the photon above the bond dissociation energy resides in the fragments of the dissociation as translational rotational and vibrational energy. As a result, the products of ablative photodecomposition are ejected from the surface of the film or "ablate." It is estimated that the material transports out of the irradiated area in about ten nanoseconds, and so as a result there is very little or no heating of the substrate.

The above mentioned threshold of intensity of the radiation (fluence per pulse) probably has to do with the amount of excess energy available to transport the fragments away from the surface and, clearly, the depth of etching per pulse is a function of the fluence of the pulse and has been found to be logarithmically dependent on the intensity. The features of the reaction that define it as ablative photodecomposition are that the material ablates without damaging (minimal damage) any of the remainder of the sample, the average velocity of the ablated material particles is 1000 to 2000 meters per second away from the surface, the angular spread is within 25 to 30 degrees of normal and peaks in a direction normal to the surface, and the material ablates layer by layer as successive pulses of the far-ultraviolet radiation are directed to it. The result of this ablation process is a very clean hole on the material, leaving behind a well-defined pit, of which the sides are straight and essentially normal to the surface and the bottom is flat and essentially parallel to the surface, and each pulse removes about the same depth of material. Hence, the depth of the pit (or etch by radiation) can be rather precisely controlled by metering the intensity and the number of the pulses.

In all of the above-described uses of far-ultraviolet laser radiation pulses, produced almost exclusively by excimer lasers, the problem arises of focusing the laser pulses on a target area of the work piece surface to produce a required intensity at the target (pulse fluence). For this purpose, a conventional refractive lens optical system for focusing to increase the pulse fluence so that it is greater at the target than from the laser is not suitable. Refractive lenses made of quartz, $CaF_2$ or $MgF_2$ cannot withstand the high-fluence laser pulses they must transmit. For these reasons, there are not available suitable glasses from which to fabricate a refractive lens to be used in such a focusing lens system, particularly for such intense ultraviolet radiation below 200 nm wavelength. In addition, a refractive lens focal length varies with wavelength and so a system of refractive lenses must be adjustable for different wavelength radiation. It is one object of the present invention to provide a method and means of increasing the fluence of the far-ultraviolet laser pulses and focusing the pulses on the target wherein refractive lenses are not used.

SUMMARY OF THE INVENTION

According to a generic feature of the present invention, the excimer laser pulses of far-ultraviolet radiation are directed from the excimer laser and focused on a target of a work piece using a reflecting objective lens system immediately opposite the work piece for increasing the fluence of the far-ultraviolet laser pulses and focusing the pulses on the target. This objective lens system is oriented with its optical axis essentially normal to the plane of the work piece surface. All beam focusing optical surfaces in it are reflecting and formed by coatings of materials that are entirely suitable for producing 90% or better reflectance of the far-ultraviolet wavelength and do not degrade excessively even when reflecting pulses of fluence several times greater than the fluence of pulses from the laser over useful operating intervals even at the greatest rate of pulses from the laser. By this technique, the applicant avoids problems inherent in most glass materials presently available for refracting lenses and provides an objective lens system that focuses all radiation regardless of wavelength at the same target point.

Problems arise in the use of such a reflecting objective lens system. inasmuch as it includes a large concave reflector with an entrance aperture at the axial center through which radiation is admitted and a relatively small convex reflector facing the large reflector and coaxial with the aperture and supported by lateral support members (legs or wires). All radiation that enters the system through the aperture falls on the small convex reflector, reflects to the large concave reflector and reflects from that around the convex reflector to the target immediately behind the convex reflector. The problems that arise are: first, the laser beam must avoid interference of the convex reflector lateral support members (obstructing supports); and, second, the small convex mirror must not intercept or block radiation reflected from the large concave reflector toward the target (obstructing objective).

A solution to the second of these problems is to de-center the beam so that the illuminated area of the convex reflector is displaced laterally with respect to the optical axis of the microscope, and so it is reflected to the large concave reflector, which in turn reflects the beam around the small convex reflector on one side thereof and focuses it on or near the target. This technique has two disadvantages: first, the diffraction pattern in the image plane becomes asymmetric; and second, the obstructed region of the aperture moves laterally away from the center of the apertures for image points not in the center of the field of view.

Another solution to the second of these problems is to form the laser beam into a ring of illuminated area on the entrance aperture of the objective lens system. In this effort, care must be taken to assure that even illumination is achieved across the object region and, also, to avoid excessively high fluence on any of the optical reflecting surfaces. Implementing this technique involves using conical mirrors that transform the initial laser beam into a ring. However, this may require a long optical train in order to avoid high fluence on the optical elements in the train.

Neither of the above solutions solve both problems and they introduce new problems which are to be avoided.

It is an object of the present invention to provide a method and means used in conjunction with a reflecting objective lens system of the present invention which avoids some of the limitations and problems that arise in applying the other solutions described above.

It is another object to provide an optical system for focusing a laser beam on a work piece surface wherein all optical elements of the system that are subject to impingement thereon of the most intense radiation of the system are reflectors rather than refractors.

It is another object to provide an improved optical system for directing and focusing far-ultraviolet radiation from a source on a target wherein the intensity of the radiation at the target is several times greater than the intensity of radiation at the source.

It is another object to provide an improved optical system for directing and focusing a laser beam on the surface of a work piece in an integrated circuit fabrication process such as ablation, deposition, impurity implantation or laser induced chemistry.

It is another purpose to provide an improved optical system for directing and focusing a laser beam in a laser initiated integrated circuit fabrication process.

It is another purpose to provide an improved optical system for directing and focusing a laser beam in a laser exposure process of ablation, radiation etching or deposition.

It is another object to provide an improved optical system for directing and focusing a laser beam on a material surface to cause ablative photodecomposition of the surface material.

It is another object to provide a method and means of viewing the target of the laser beam in any and all of the above objects and particularly for viewing the target while the laser beam is impinging thereon.

It is a further object in conjunction with the above that at least a part of the optical system for viewing the target includes the reflecting objective lens system of the laser optical system.

These and other features and objects of the present invention are apparent from the following specific description of embodiments of the invention taken in conjunction with the figures.

DESCRIPTION OF THE FIGURES

FIG. 3 is an optical diagram of the same optical system shown in FIGS. 1 and 2 as viewed from the side showing the rays of laser radiation and the relative positions of optical parts of the system;

FIG. 4 shows the same optical parts and rays of laser radiation as shown in FIG. 3, but viewed from the top to show the split beams of laser radiation and how they are directed to the reflecting objective lens system for focusing on the target area of the work piece surface;

FIG. 5 depicts the cross-section of the laser beam as it issues from the laser showing the distribution of radiation intensity in the beam cross-section;

FIG. 6 shows the relative size of the cross-section of the laser beam at the first aperture stop, whereby the cross-section of the beam is reduced to that portion of the beam of nearly constant intensity in the cross-section;

FIGS. 7 and 8 are axial and top views, respectively, of the first split-lens L1 of the system;

FIGS. 9 and 10 are axial and top views, respectively, of the second split lens, L2, of the system;

FIG. 11 is an enlarged top view of the reflecting objective lens system showing just the reflecting areas of the small convex and the large concave reflectors thereof, the entrance aperture (hole) at the center of the concave reflector for admitting the laser beams into the system and broken lines defining the spots on the reflectors impinged upon by the split laser beams; and FIG. 12 is an enlarged side view of the convex reflector showing the support structure therefor and the side thereof that faces the target.

EMBODIMENTS OF THE INVENTION

Figure 1:
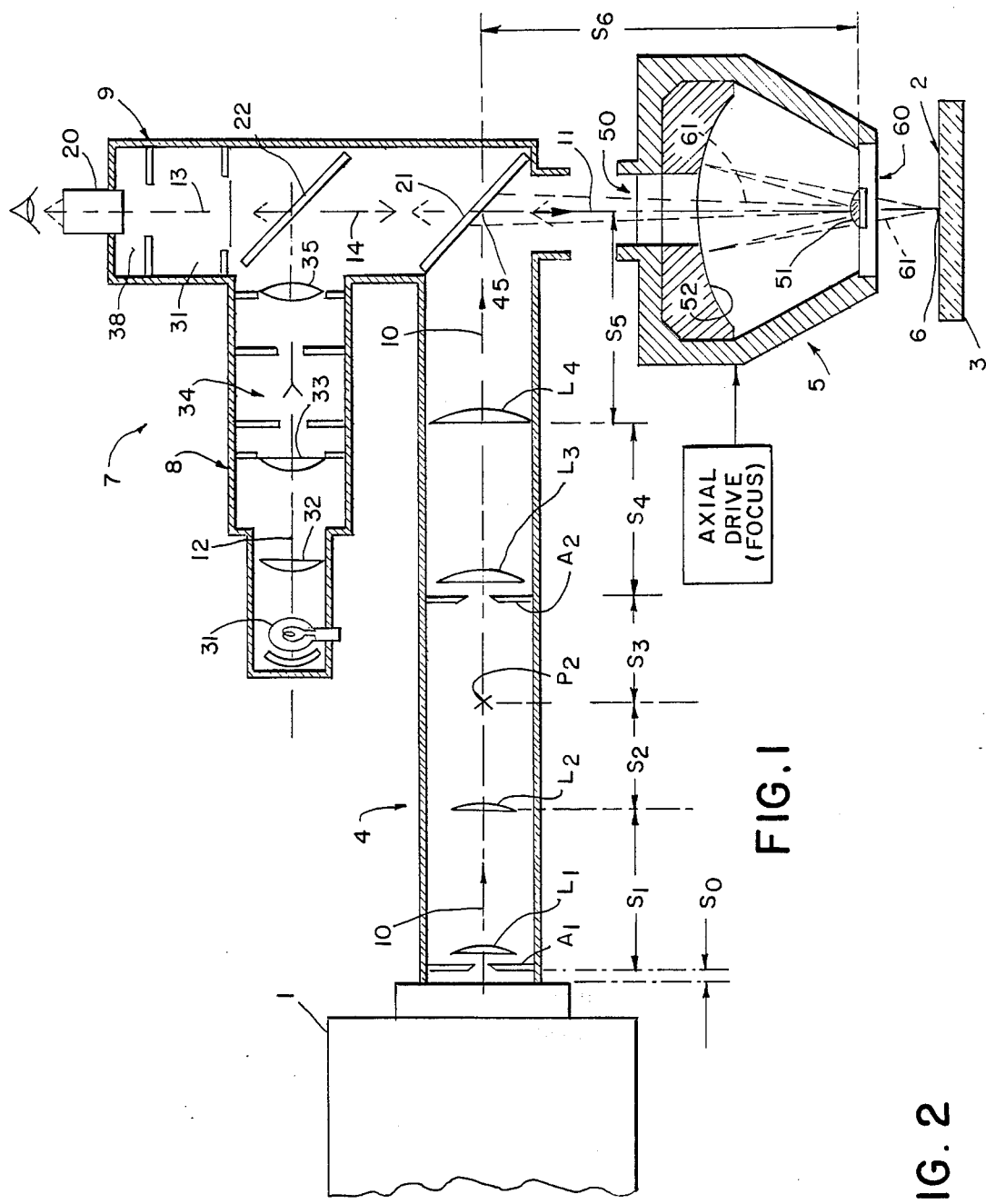
FIG. 1 is a schematic layout side view of an optical system for targeting a workpiece for ablative photodecomposition while illuminating the target and surrounding area with visible light and viewing the area. The system includes a pulsed laser light source, an optical system for directing the pulses to a reflecting objective lens system that focuses the laser pulses of radiation on the surface of a work piece, and a visible light optical system incorporating part of the same optical path, including the reflecting objective lens system, for illuminating the work piece surface wth visible light, whereby the ablation process of the laser beam on the surface can be viewed or recorded as it occurs.

FIG. 1 is a schematic layout showing in cross-section the significant optical and other parts of an optical system for ablative photodecomposition (APD) of an organic material, such as a polymer film, on a work piece to selectively remove by ablation part of the film. This system may include a source of laser pulses, such as an argon-fluoride (ArFl) laser 1, producing pulses at 193 nm wavelength and fluence up to about 200 milijoules per square centimeter (mJ/cm$^2$) at a rate up to about 500 pulses per second.

The optical system 4 directs the laser beam issuing from Laser 1 along the optical system axis 10 to a reflecting objective lens system 5 that focuses the laser beam on the surface 2 of work piece 3. At the target center 6 of the laser beam on the surface 2, the surface material is selectively removed, layer by layer, by the APD process described hereinabove and controls are provided (not shown) for moving the work piece laterally with respect to the optical axis 11 of the reflecting objective lens system, thereby moving the area of selective removal of material.

Illumination For Observation

The process of selective removal by ablation of the surface material is viewed by an observer through the visible light optical illumination and viewing system 7 that delivers visible the illuminating part 8 thereof that is directed along the axis 14 of system 7 to the optical axis 11 of objective lens system 5, to illuminate the target 6 and the surrounding area on the film 2 so that it can be viewed through eyepiece 20 of the viewing part 9 of the system 7 along optical axis 14 that aligns directly with and includes the objective lens system optical axis 11.

Thus, visible light illuminating and viewing system 7 includes a part of the laser optical system. In particular, it includes objective lens system 5. The two systems merge at dichroic mirror 21 which incorporates an interface that reflects far-ultraviolet radiation incident thereon at 45, but transmits visible radiation. Hence, the laser beam along optical axis 10 is reflected by mirror 21 along axis 11 of reflecting objective lens system 5. At the same time, light from the illuminating part 8. of system 7 is reflected by half-silvered mirror 22 along visible light path 14 to dichroic mirror 21 and passes through that mirror along optical axis 11 into objective lens system 5 from which it is focused onto the target to illuminate an area thereof. As a result of this illumination, visible light reflected from the illuminated target area enters objective lens system 5 around small convex mirror 51 and is directed by the reflectors in 5 along axis 11 and through dichroic mirror 21 along visible light optical axis 14, through half-silvered mirror 22 to eyepiece 20 where it can be viewed by an observer. Thus, eyepiece 20 and objective lens 5 form a high resolution microscope for visible light and enable the observer to view the workpiece during the APD process.

In a preferred embodiment , an operator observing the surface of the work piece and the target area through eyepiece 20 may control the number of laser pulses fed into the system and the position of the work piece. In this way, the depth of removal accomplished by APD and the course of the ablation over the work piece may be controlled and observed by an operator.

The illuminating part 8 of system 7 includes a source of white light, such as an incandescent lamp 31, and along the optical axis 12 thereof, between the lamp and half-silvered mirror 22, are lens 32, lens 33, aperture 34, and lens 35, in that order, all of which substantially direct the white light from source 31 as a parallel light beam to half-silvered mirror 22. This visible light beam is directed from mirror 22 through dichroic mirror 21, along optical axis 11 of objective lens system 5 which focuses the visible light to illuminate the target area. The illuminated target area is then viewed along optical axes 11, 14 and 13 through viewing lenses 37 and 38 and eyepiece 20.

Laser Beam Focusing Techniques

The problems of how to direct and focus the laser beam onto the target using a reflecting objective lens system of the type described herein that has an obstructing aperture (the small convex mirror 51) and obstructing lateral support arms 59 for the mirror, a large concave mirror 52 and a central entrance aperture 50 in mirror 52 still remain. As already mentioned, the simplest solution to the obstructing aperture problem is to de-center the laser beam through the objective lens system so that it impinges on the convex mirror 51 thereof off center (off axis 11) and from there to mirror 52 and then to the target. However, this reduces the effective aperture and produces asymmetric diffraction patterns in the image on the target, and does not avoid the obstructing lateral support arms of mirror 51.

The other technique that could be pursued to solve the obstructing aperture problem involves conical mirrors and is accompanied by difficulties of high-flux densities and a long optical train.

Split Beam Technique

It is preferred to solve both of these problems (the obstructing aperture and the obstructing lateral supports) in another way: by splitting the initial laser beam into two halves that are displaced slightly laterally from axis 10 of the laser beam optical system and so the two halves (two separate beams) are reflected by dichroic mirror 21 along axis 11 of objective lens system 5, each displaced laterally to one side of that axis. In FIG. 1, the side view, one of these two beams (the one closer to the viewer) is represented by dash (broken) lines. The other beam is behind it. By positioning the two laser beams this way, the convex mirror lateral supports can be oriented between the beams.

Figure 2:
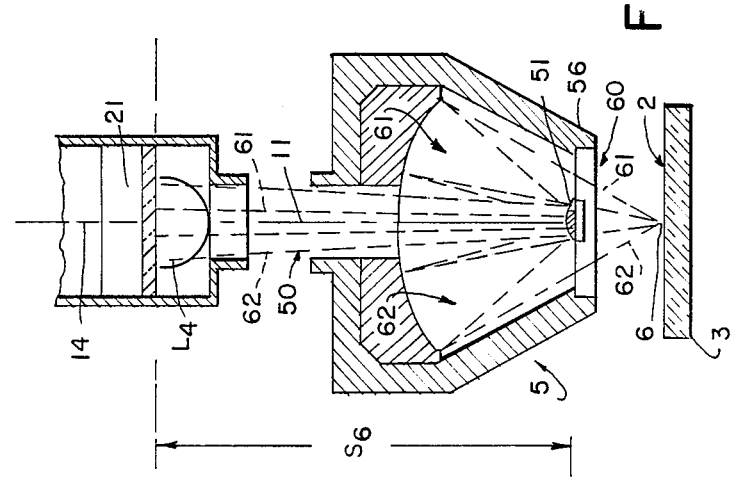
FIG. 2 is an end view of the same optical system showing only the reflecting objective lens system thereof and illustrating the reflections therein of the laser beam entering it as an aid to understanding the split-beam technique of the present invention.

FIG. 2 is an end view of objective lens system 5 and part of the laser beam optical system. It shows both of the laser beams, each represented by a dash (broken) line and a dot-dash (broken) line that depict the outside rays of the beam. Laser beam 61 is on the right in FIG. 2 and beam 62 is on the left. They are essentially side-by-side from dichroic mirror 21 to convex reflector 51, and they impinge that reflector on opposite sides of the axis 11.

FIG. 11 is an enlarged view taken along axis 11 showing the two reflectors 51 and 52 and the approximate areas of the reflectors illuminated by the two laser beams. As can be seen from these figures, the optics of objective lens system 5 and the spatial positioning, size and divergence of the two laser beams as they enter objective lens system 5 system at entrance aperture 50, that the outside rays of the beams (represented by dash and dot-dash lines) pass through the annular opening 60 at the bottom of the system defined by the inside of the housing 56 and convex mirror 51 and focus near the target 6 on the film 2 of the work piece.

Convex mirror 51 of objective lens system 5 is subject to high fluence radiation pulses and so particular care must be taken in fabricating that reflector. FIG. 12 is an enlarged side view of reflector 51 showing its reflective surface 57 mounted in a holder 58 that is suspended by lateral support members (arms or wires) 59 secured to the opening 60 at the bottom of the system. The fluence of the beams where they impinge reflector 51 may be several times the fluence of the laser beam as it emerges from laser 1, and so the fluence at reflector 51 can be several hundred $mJ/cm^2$.

A suitable reflector coating for 193 nm radiation is commercially available with a reflectance of 96% and better for zero degree angle of incidence, and it withstands repeated pulses at fluences of several hundred $mJ/cm^2$. For example, there is a coating provided under the trade name "Suprasil", Coating #193FR" provided by Action Research Corporation of Acton, Mass. that meets these requirements. This coating on an aluminum sub-coat is suitable for the use described herein. The "Suprasil" coating does not reflect visible light, however the aluminum sub-coat does. This is an advantage as it supports another feature of the present invention, described hereinabove, for illuminating the surface of the work piece with visible light so that it can be viewed by an observer as the ablation process occurs.

Laser Optical System

Turning next to FIGS. 3 and 4, there are shown two views, a side view and a top view, of the laser rays, through the laser optical system 4 and into reflecting objective lens system 5. The formation of the split laser beam, the optical components of the system, and an explanation of the optical structures involved are described below in conjunction with FIGS. 5 through 12 also.

Turning first to FIG. 3, the same view of the laser optical system is shown as shown also in FIG. 1 and is referred to herein as the side view. It shows the relative positions of optical components of the system and illustrates the extreme rays of one of the beams. FIG. 4 is a top view and shows both of the beams. The objective lens system in FIG. 3 is a side view somewhat the same as the view in FIG. 1. However, in FIG. 4 is not a top view of the objective lens system, but is an end view similar to the view shown in FIG. 2, as it is more illustrative of the course of the rays through the reflecting objective lens system to the target.

Lens L1 is a converging lens located near the exit aperture A1 which reduces the cross-section of the laser beam launched into optical system 4 as explained with reference to FIGS. 5 and 6. FIG. 5 shows the initial cross-section of the laser beam, A0, as it issues from the laser and may be 22 mm × 6 mm and have a divergence of 2 to 4 milliradians. The intensity of the beam across the major and minor crosswise axes is represented as Ix and Iy plots in FIG. 5. The purpose of aperture A1 is to admit into optical system 4 only the central section of the beam over which intensity is essentially uniform throughout.

Lens L1 forms a spot of very intense radiation at the focus of the lens equal in diameter to the focal length of the lens mulitplied by the divergence angle of the laser beam. Between lens L1 and its focus is located lens L2 that images lens L1 onto aperture A3. Near the object to be illuminated is lens L3 that images the intermediate image formed by lens L1 onto the entrance pupil of the reflecting objective lens system, convex reflector 51. More particularly, this function is performed by lenses L2 and L3 in combination. As mentioned, in this case, the pupil of objective lens system 5 is convex reflector 51 and the area illuminated on the convex reflector is the obstructed portion of the aperture.

Lens L1 has a focal length for 193 nm radiation of 166 mm. Lens L2 focal length is 62.25 mm, and it is placed 75.6 mm beyond lens L1. The divergent laser beam is focused by lens L1 at 166 mm beyond lens L1 to a spot 0.664 mm by 1.33 mm. Lens L2 re-images this spot to point P2 which is a distance 36.9 mm beyond lens L2 and the spot size at point P2 is 0.27 mm×0.54 mm. Lens L2 images lens L1 at a point 353 mm beyond lens L2, and the image of L1 is magnified 4.66 times. This image of L1 is the aperture A3 to be illuminated. The lenses L3 and L4 are placed to image the image from point P2 onto the objective lens system aperture (convex reflector 51).

All that is described above with reference to FIG. 3 pertains to each of the beams that are split from the initial laser beam. FIG. 4, the top view of the optical system, shows the two beams 61 and 62. These beams are initially split from the radiation emerging from aperture A1 and shown in FIG. 6. Lenses L1 and L2 accomplish this split. Each of these lenses is split into halves, and the halves are displaced laterally from each other. As a result, aperture A3 is illuminated by two separate laser beams, 61 and 62, which come into aperture A3 in different directions and arise from adjacent areas of the initial laser beam.

The median ring of the unobstructed portions of objective lens system 5 is at about numerical aperture 0.36. The magnification of the object is 36, and so a ray from the center of aperture A3 to this median ring will make an angle of about 0.01 radians to the axis. A ray at this angle will intersect lens L2 at a distance of about 3.53 mm from the axis. The regions of lens L1 to be imaged at aperture A3 are taken to be 3 millimeters square and are both adjacent to the axis. For a ray from the center of a 3 mm square (1.5 mm off axis) to pass lens L2 at 3.53 mm off axis, the split lenses of L1 must be displaced laterally by a distance of about 5.95 mm. Thus, lens L1 is made in two parts as shown by FIGS. 7 and 8. FIGS. 7 shows the two parts, L1a and L1b, each with an optical center displaced a distance D1 which is equal to 5.95 mm laterally away from the axis 10.

Lens L2 is also split into decentered parts, as shown in FIGS. 9 and 10. Here, the two parts L2a and L2b are decentered from the axis 10 and so are spaced apart a dimension D2. Dimension D2 is such that a point 1.5 mm off axis at lens L1 is imaged on axis at point P2. In this example, the amount of decentration (dimension D2) is about 1.235 mm.

To image the laser beam onto the reflecting objective lens system 5 convex reflector 51, requires a lens of focal length of 115 mm. The illuminated spots of each of the laser beams 61 and 62 on the objective would then be 0.15 mm×0.13 mm, and this would be too high a fluence or flux density at the convex reflector and would probably damage or destroy the reflective coating. Instead, point P2 is focused about 27 mm beyond convex mirror 51, and so lens L3 has a focal length of about 125 mm or greater, and its position may be adjusted by trial and error to ensure that the fluence of the beams on the convex mirror 51 are not excessive. It is preferred that the illuminated spots on convex mirror 51, as shown in FIG. 11, are each about 1.625 mm by 1.75 mm; and, of course, the illuminated spots on the large concave reflector 52 are much larger and consequently of much lower fluence.

At lens L1, the fluence of the pulses of laser radiation are essentially the same as the output of the laser and may be typically on the order of a few up to 100 mJ/cm$^2$. At lens L2 the fluence is higher than at the laser by a factor of about three. At aperture A3 the fluence of each of the beams is about 8% of what it is at the laser output. Finally, at the objective convex reflector 51, the fluence is about 1.36 times the fluence at the output of the laser. This is then focused by large concave reflector 52 onto the target 6, producing at the target a fluence 80 to 100 or more times the laser output fluence and sufficient to cause useful ablative photodecomposition of the target material.

CONCLUSIONS

The embodiment of the present invention described herein incorporates all features of the invention, and when all of those features are included, provides an optical system for performing ablative photodecomposition or photoablation at the surface of an organic on a work piece wherein the process can be viewed by an observer who may control the position of the target area of ablation of the work piece and control the depth of ablation. Clearly, features of this system with some modifications may be employed to form other embodiments of the invention to perform other processes, such as other laser initiated processes in the fabrication of integrated circuits, including, but not limited to, ablation, deposition, impurity implantation, other chemical processes and selective removal of organic and other materials. Other embodiments will be apparent to those skilled in the art without departing from the spirit and scope of the invention as set forth in the appended claims.

What is claimed is:

1. An optical system for directing a beam of pulses of relatively intense ultraviolet radiation to a work piece surface comprising,
    (a) a source of ultraviolet radiation producing a beam of pulses of substantially monochromatic, directional, ultraviolet radiation of relatively high pulse fluence $F_0$, on the order of 100 mJ/cm$^2$ or greater,
    (b) a reflecting objective lens system having an optical input and an optical output, said optical output being immediately adjacent to said work piece surface, said optical input receiving said source radiation of pulses of fluence $F_0$,
    (c) said reflective objective lens system having two or more reflecting surfaces that are highly reflective of said ultraviolet radiation and
    (d) at least one of said reflecting surfaces being formed of material that readily withstands said ultraviolet radiation pulses of fluence $F_0$ incident thereon with negligible degradation of said surface reflectivity,
    (e) whereby said reflecting objective lens system focuses said beam pulses on said work piece surface to a fluence $F_t$, which is subtantially greater than $F_0$.

2. An optical system as in claim 1 wherein,
    (a) said reflecting objective lens system has an optical axis and includes two reflectors facing each other on said optical axis, a large concave reflector and a small convex reflector,
    (b) said source radiation is incident first on said small convex reflector and then on said large concave reflector which focuses said radiation on said work piece surface and
    (c) said small convex reflector has the reflective surface thereof formed of said material.

3. An optical system as in claim 2 wherein,
    (a) said reflective objective lens system optical input includes an entrance aperture at the center of said large concave reflector concentric with said optical axis, (b) whereby said beam pulses from said source of relatively high fluence $F_0$ enter said reflecting objective lens system through said entrance aperture.

4. An optical system as in claim 3 wherein,
(a) substantially all of said pulses that enter said reflecting objective lens system optical input through said entrance aperture in said large concave reflector thereof impinge on said small convex reflector and are reflected therefrom to said large concave reflector and reflect therefrom through said optical output to said work piece surface.

5. An optical system as in claim 3 wherein,
(a) said source includes a laser producing a beam of pulses of substantially monochromatic directional ultraviolet radiation and
(b) optical means defining an optical path for said laser beam between said laser and said reflecting objective lens system optical input,
(c) means are provided in said optical path for dividing said laser beam into separate beams along separate paths and
(b) means are provided for directing said separate beams through said entrance aperture in said large concave reflector to opposite sides of the center of said small convex reflector,
(c) whereby said separate beams reflect from said small convex reflector to said large concave reflector and reflect therefrom through said optical output to the same area on said work piece surface.

6. An optical system as in claim 5 wherein said separate beams cross at the same point on said work piece surface.

7. An optical system as in claim 5 wherein said separate beams are substantially the same cross-section shape and size.

8. An optical system as in claim 5 wherein,
(a) said separate beams cross at the same point on said work piece surface and
(b) said separate beams are the same cross-section shape and size at said point on said work piece surface.

9. An optical system as in claim 8 wherein the cross sections of said separate beams are in registration at said point on said work piece surface.

10. An optical system as in claim 9 wherein,
(a) means are provided for making the optical lengths of said separate paths, in terms of the wave length of said laser radiation, different,
(b) whereby the wave fronts of said separate beams at said point on said work piece surface are not in the same phase.

11. An optical means as in claim 8 wherein,
(a) means are provided for making the optical length in terms of the wavelength of said laser radiation of the paths of said separate beams different,
(b) whereby the wave fronts of said separate beams at said points on said work piece surface are not in the same phase.

12. An optical system as in claim 1 including,
(a) a source of visible light,
(b) means for directing said visible light to said reflecting objective lens system through said optical input thereof,
(c) whereby said visible light illuminates said work piece surface and
(d) visible light optical means, including an eyepiece for viewing said work piece surface through said reflecting objective lens system.

13. An optical system as in claim 12 wherein said reflecting objective lens system reflecting surfaces substantially reflect visible light as well as said laser radiation.

14. An optical system as in claim 13 wherein said reflecting objective lens system reflecting surfaces are formed by a layer of material, such as said material, that reflects said laser radiation and with a layer of visible light reflecting material.

15. An optical system as in claim 12 wherein,
(a) said reflecting objective lens system includes two reflectors facing each other on said optical axis, a large concave reflector and a small convex reflector and
(b) said beam radiation is incident first on said small convex reflector and then on said large concave reflector which focuses said radiation on said work piece surface.

16. An optical system as in claim 15 wherein,
(a) visible light that is incident on said workpiece surface reflects from said work piece surface to said large concave reflector and therefrom to said small convex reflector and emerges from said entrance aperture and is directed by said visible light optical means to said eyepiece.

17. An optical system as in claim 15 wherein,
(a) of said visible light directed to said reflecting objective lens system, some is directly intercepted by said small convex reflector thereof and
(b) some is directly intercepted by said work piece surface,
(c) whereby the area of said work piece surface illuminated by said visible light includes the area illuminated by said laser beam and a portion of the area surrounding said area illuminated by said laser beam, all referred to herein as the visible area of said work piece surface.

18. An optical system as in claim 5 including,
(a) a source of visible light,
(b) means for directing said visible light to said reflecting objective lens system through said entrance aperture in said concave reflector thereof,
(c) whereby said visible light illuminates said work piece surface and
(d) visible light optical means, including an eyepiece for viewing said work piece surface through said entrance aperture in said large concave reflector.

19. An optical system as in claim 18 wherein,
(a) visible light that reflects from said work piece surface to said large concave reflector and therefrom to said small convex reflector emerges from said entrance aperture and is directed by said visible light optical means to said eyepiece.

20. An optical system as in claim 19 wherein,
(a) of said visible light directed to said reflecting objective lens system, some is directly intercepted by said small convex reflector thereof and
(b) some is directly intercepted by said work piece surface,
(c) whereby the area of said work piece surface illuminated by said visible light includes the area illuminated by said laser beam and a portion of the area surrounding said area illuminated by said laser beam, all referred to herein as the visible area of said work piece surface.

21. In a system for illuminating the surface of a work piece with radiation of high flux density of magnitude substantially greater than the flux density of said radiation from the source thereof, means for directing and focusing said radiation from said source to said work piece surface comprising,
(a) a source of ultraviolet radiation producing a beam of pulses of substantially monochromatic, directional, ultraviolet radiation of relatively high pulse fluence $F_0$, on the order of 100 mJ/cm$^2$ or greater,
(b) a reflecting objective lens system having an optical input and an optical output, said optical output being immediately adjacent to said work piece surface, said optical input receiving said source radiation of pulses of fluence $F_0$,
(c) said reflecting objective lens system having two or more reflecting surfaces that are highly reflective of said ultraviolet radiation and
(d) at least one of said reflecting surfaces being formed of material that readily withstands said ultraviolet radiation pulses of fluence $F_0$ incident thereon with negligible degradation of said surface reflectivity,
(e) whereby said reflecting object lens system focuses said beam pulses on said work piece surface to a fluence $F_t$, which is substantially greater than $F_0$.

22. A system as in claim 21 wherein,
(a) said reflecting objective lens system has an optical axis and includes two reflectors facing each other on said optical axis, a large concave reflector and a small convex reflector,
(b) said beam radiation is incident first on said small convex reflector and then on said large concave reflector which focuses said radiation on said work piece surface and
(c) said small convex reflector has the reflective surface thereof formed of said material.

23. A system as in claim 22 wherein,
(a) said reflecting objective lens system optical input includes an entrance aperture at the center of said large concave reflector concentric with said optical axis,
(b) whereby said beam pulses from said source of relatively high fluence $F_0$ enter said reflecting objective lens system through said entrance aperture.

24. A system as in claim 23 wherein,
(a) said source includes a laser producing a beam of pulses of subtantially monochromatic directional ultraviolet radiation and
(b) optical means defining an optical path for said laser beam between said laser and said reflecting objective lens system,
(c) means are provided in said optical path for dividing said laser beam into separate beams along separate paths and
(b) means are provided for directing said separate beams through said entrance aperture in said large concave reflector to opposite sides of the center of said small convex reflector,
(c) whereby said separate beams reflect from said small convex reflector to said large concave reflector and reflect therefrom through said optical output to the same area on said work piece surface.

25. A system as in claim 24 wherein,
(a) said separate beams cross at the same point on said work piece surface and
(b) said separate beams are the same cross-section shape and size at said point on said work piece surface.

26. A system as in claim 21 wherein,
(a) a source of visible light,
(b) means for directing said visible light to said reflecting microscope through said optical input thereof,
(c) whereby said visible light illuminates said work piece surface and
(d) visible light optical means, including an eyepiece for viewing said work piece surface through said entrance apeture in said large concave reflector.

27. A system as in claim 26 wherein said reflecting objective lens system reflectors substantially reflect visible light as well as said laser radiation.

28. A system as in claim 27 wherein said reflecting objective lens system reflecting surfaces are formed by a layer of material, such as said material, that reflects said laser radiation and with a layer of visible light reflecting material.

29. A system as in claim 23 including
(a) a source of visible light,
(b) means for directing said visible light to said reflecting objective lens system through said entrance aperture in said concave reflector thereof,
(c) whereby said visible light illuminates said work piece surface and
(d) visible light optical means, including an eyepiece for viewing said work piece surface through said entrance aperture in said large concave reflector.

30. A system as in claim 29 wherein,
(a) of said visible light directed to said reflecting objective lens system, some is directly intercepted by said small convex reflector thereof,
(b) whereby the area of said work piece surface illuminated by said visible light includes the area illuminated by said laser beam and a portion of the area surrounding said area illuminated by said laser beam, all referred to herein as the visible area of said work piece surface.

31. In a system for causing ablative photodecomposition at the surface of an organic material by pulsed ultraviolet laser radiation from a source of such laser radiation pulses of fluence $F_0$, the improvement comprising,
(a) a source of said ultraviolet laser radiation producing a beam of pulses of substantially monochromatic, directional, ultraviolet radiation of pulse fluence $F_0$,
(b) a reflecting objective lens system having an optical input and an optical output, said optical output being immediately adjacent to said work piece surface, said optical input receiving said source radiation pulses of fluence $F_0$,
(c) said reflecting objective lens system having two or more reflecting surfaces that are highly reflective of said ultraviolet radiation and
(d) at least one of said reflecting surfaces being formed of material that readily withstands said ultraviolet radiation of intensity $I_0$ incident thereon with negligible degradation of said surface reflectivity,
(e) whereby said reflecting objective lens system focuses said laser beam on said work piece surface to a pulse fluence $F_t$ which is substantially greater than $F_0$.

32. A system as in claim 31 wherein, (a) said reflecting objective lens system has an optical axis and includes two reflectors facing each other on said optical axis, a large concave reflector and a small convex reflector, (b) said beam radiation is incident first on said small convex reflector and then on said large concave reflector which focuses said radiation on said work piece surface and (c) the reflecting surface of said small convex reflector is formed of said material.

33. A system as in claim 32 wherein, (a) said reflecting objective lens system optical input includes an entrance aperture at the center of said large concave reflector concentric with said optical axis, (b) whereby said beam pulses from said source of relatively high fluence $F_0$ enter said reflecting objective lens system through said entrance aperture.

34. A system as in claim 33 wherein, (a) said source includes a laser producing a beam of pulses of substantially monochromatic directional far-ultraviolet radiation and (b) optical means defining an optical path for said laser beam between said laser and said reflecting objective lens system, (c) means are provided in said optical path for dividing said laser beam into separate beams along separate paths and (b) means are provided for directing said separate beams through said entrance aperture in said large concave reflector to opposite sides of the center of said small convex reflector, (c) whereby said separate beams reflect from said small convex reflector to said large concave reflector and reflect therefrom through said optical output to the same area on said work piece surface.

35. A system as in claim 34 wherein, (a) said separate beams cross at the same point on said work piece surface and (b) said separate beams are substantially the same cross-section shape and size at said point on said work piece surface.

36. A system as in claim 31 wherein, (a) a source of visible light, (b) means for directing said visible light to said reflecting objective lens system through said optical input thereof, (c) whereby said visible light illuminates said work piece surface and (d) visible light optical means, including an eyepiece for viewing said work piece surface through said reflecting objective lens system.

37. A system as in claim 36 wherein said reflecting objective lens system reflecting surfaces substantially reflect visible light as well as said laser radiation.

38. A system as in claim 37 wherein said reflecting objective lens system reflecting surfaces are formed by a layer of material such as said material that reflects said laser radiation and with a layer of visible light reflecting material.

39. A system as in claim 33 including (a) a source of visible light, (b) means for directing said visible light to said reflecting objective lens system through said entrance aperture in said concave reflector thereof, (c) whereby said visible light illuminates said work piece surface and (d) visible light optical means, including an eyepiece for viewing said work piece surface through said entrance aperture in said large concave reflector.

40. A system as in claim 39 wherein, (a) of said visible light directed to said reflecting objective lens system some is directly intercepted by said small convex reflector thereof, (b) whereby the area of said work piece surface illuminated by said visible light includes the area illuminated by said laser beam and a portion of the area surrounding said area illuminated by said laser beam, all referred to herein as the visible area of said work piece surface.

41. An optical system for directing a laser beam to a work piece surface comprising,, (a) a source of laser radiation producing a beam of pulses of substantially monochromatic, directional radiation of relatively high pulse fluence $F_0$, (b) a reflecting objective lens system immediately adjacent to the work piece surface, the optical axis of said reflecting ojbective lens system being essentially normal to the plane of said work piece surface, (c) said source including a laser producing a beam of substantially monochromatic, directional, pulsed radiation and (d) optical means defining an optical path for said laser beam between said laser and said objective lens system, (e) whereby said reflecting objective lens system focuses said laser beam on said work piece surface to a pulse fluence $F_t$ which is substantially greater than $F_0$.

(f) a source of visible light, (g) means for directing said visible light to said objective lens system, (h) whereby said visible light illuminates said work piece surface and (i) visible light optical means, including an eyepiece for viewing said work piece surface through said objective lens system.

42. In a method of selectively removing material from a surface of an organic material by ablative photodecomposition of the material by a pulsed beam of ultraviolet laser radiation from a source of such laser radiation pulses of relatively high fluence $F_0$, the improvement including the steps of:

(d) intercepting said ultraviolet laser radiation beam of pulses of fluence $F_0$ by a first relatively small convex reflector that is adjacent to said surface, the optical axis of said first reflector being essentially normal to the plane of said surface and the reflective face thereof facing away from said surface and (e) intercepting said ultraviolet laser radiation beam that reflect from said first reflector by a second relatively large diameter concave reflector that is optically between said first reflector and said laser, the optical axis of said second reflector being essentially coincident with the optical axis of said first and the reflective face thereof facing toward said surface (f1) whereby said reflectors focus said laser radiation pulses on said surface to a pulse fluence $F_t$ which is substantially greater than $F_0$.

43. A method as in claim 42 wherein before step (d), (c) said laser radiation pulses pass through an entrance aperture at the center of said second reflector concentric with said optical axis.

44. A method as in claim 43 wherein before step (c),
(a) dividing said laser beam into separate beams along separate paths and
(b) then directing said separate beams through said entrance aperture to opposite sides of the center of said first convex reflector,
(f2) whereby said separate beams are focused on the same area on said work piece surface.

45. A method as in claim 44 wherein,
(a1) in said step (a) said laser beam is divided into two separate beams of equal intensity and equal cross section dimensions,
(f3) whereby said separate beams are the same cross-section shape, size and intensity where they are focused on said work piece surface.

* * * * *